June 2, 1964  F. O. LUENBERGER  3,135,884
SUBMERSIBLE ELECTRIC MOTOR
Filed Jan. 5, 1959
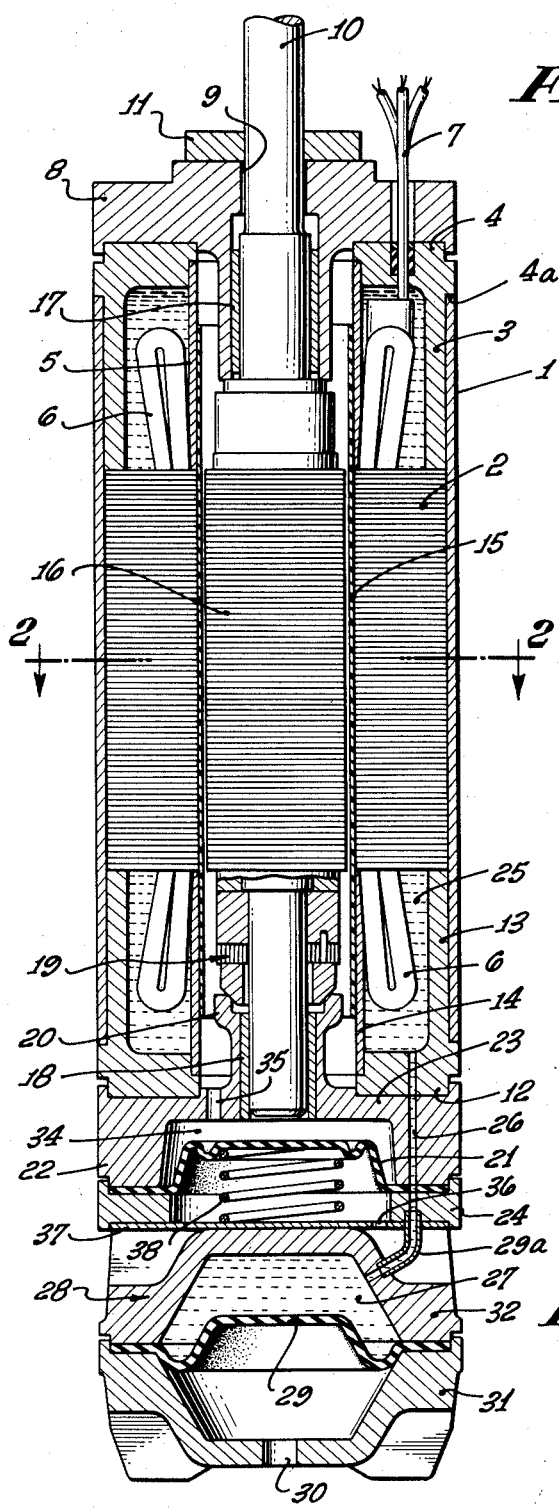
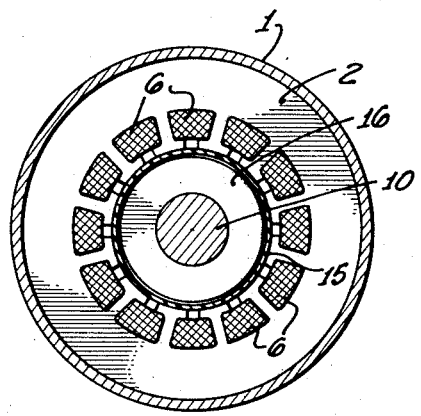
FREDERICK O. LUENBERGER
INVENTOR.
BY Flam and Flam
ATTORNEYS.

United States Patent Office 3,135,884
Patented June 2, 1964

3,135,884
SUBMERSIBLE ELECTRIC MOTOR
Frederick O. Luenberger, Los Angeles, Calif., assignor, by mesne assignments, to The Emerson Electric Manufacturing Company, St. Louis, Mo., a corporation of Missouri
Filed Jan. 5, 1959, Ser. No. 785,064
2 Claims. (Cl. 310—87)

This invention relates to electric motors adapted to be submerged in well liquid.

Such motors, for pump operation, are now in common use. Provisions are made to prevent well liquid from reaching the stator windings. The rotor, which is usually of the squirrel cage type, is accommodated within the stator.

In one form of stator structure, the stator windings are protected by enclosing or embedding the windings in a plastic, such as an epoxy resin, and by providing a tube of plastic material, such as Teflon attached to the inner periphery of the stator laminations. Such arrangements are not wholly practical, since the plastic material of the embedding structure and of the tube have voids into which water vapor from the well can penetrate, thus rendering the seal ineffective.

It is one of the objects of this invention overcome these difficulties.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a vertical longitudinal sectional view of a submersible motor incorporating the invention; and FIG. 2 is a cross-sectional view taken along a plane corresponding to line 2—2 of FIG. 1.

In the present instance, a tubular casing 1 is provided for accommodating the stack of stator laminations 2.

Telescoping within the upper end of the casing 1 is a flange 3 of a collar 4. The upper edge of the casing 1 abuts a shoulder 4a on the exterior periphery of the collar 4. The casing 1 and flange 3 may be appropriately attached together to form a fluid-tight seal between them.

A metallic sleeve 5 defines with the collar 4 and the flange 3 a space for the end turns of a stator winding 6. The stator winding 6 is accommodated in slots provided in the laminations 2 as shown in FIG. 2. Power leads 7 pass through the collar 4 for supplying electrical energy to the winding 6. These power leads may be sealingly supported in the collar 4.

The sleeve 5 is appropriately attached to the collar 4. The sleeve member 5 extends downwardly to the upper surface of the stack 2.

A cover 8 is firmly attached to the upper surface of the collar 4. It is provided with an aperture 9 for the passage of the motor shaft 10 for the purpose of operating a pump or the like. As sealing collar 11 carried by the shaft 10 cooperates with the adjacent upper annular surface of the cover 8.

A collar 12 similar to collar 4 is provided at the lower end of the motor. This collar 12 is provided with a flange 13 cooperating with the casing 1 similarly to the flange 3. A lower metallic sleeve 14 provides a sealed space for the lower end turns of the winding 6, in the same manner as sleeve 5.

A tube or sleeve 15 which may be of plastic material, such as Teflon, or of thin metal is disposed within the bore of the stack of laminations 2 and is firmly attached by any appropriate means to the sleeves 5 and 14. In this way, the outer stator structure, including casing 1, is sealed by the sleeve 15, the sleeves 5 and 14 and the flanges 3 and 13.

The shaft 10 carries the rotor 16, which has a slight air gap clearance with respect to the plastic sleeve 15. A journal bearing sleeve 17 is supported by aid of the cover 8 for the shaft 10.

At the lower end a journal bearing sleeve 18 is provided, as well as a thrust bearing structure including the element 19 carried by the shaft 10, and non-rotary thrust bearing supporting element 20.

The lower end of the casing is sealed off by a flexible cup-shaped diaphragm 21 attached to the flange 22 of a lower cover member 23. A clamping ring 24 is provided for this purpose.

Normally the seal provided by the collar 11 is not perfect, a minor amount of well water gaining entry into the space between the rotor 16 and the sleeve 15. However, the leakage is not substantial, and does not have any deleterious effect upon the motor parts. If desired, a substantially perfect seal may be provided.

It is important to maintain the winding 6 against the entry of liquid. For this reason, an oil filling 25 is provided for the sealed space in which the winding 6 is located. This filling 25 extends between the collars 4 and 12.

Furthermore, in order to ensure that there will be no pressure differential from within the sleeve 15 to the stator space holding the liquid filling 25, pressure equilibrium is maintained between the liquid 25 and the outer well liquid.

For this purpose, a port 26 leading from the space in which filling 25 is placed, conducts some of the liquid 25 to a chamber 27 defined by an inverted cup-like member 28 and a cup-shaped diaphragm 29. A sleeve 29a extends from clamp ring 24 into member 28 to maintain continuity of port 26. This port thus extends through the collar 12, the flange of diaphragm 21, clamp ring 24, sleeve 29a to the chamber 27.

The upper surface of the diaphragm 29 is thus subjected to the pressure of the liquid 25. Its lower surface is subjected to well pressure via a port 30 formed in a cover 31. This cover 31 cooperates with a body 32 to clamp the edge of the diaphragm 29.

In order to be sure that the rotor space formed by the interior surface of the sleeve 15 is subjected to the same pressure as the liquid 25, thereby ensuring against seepage of well water through the sleeve 15, use is made of the flexible diaphragm 21. This diaphragm 21 provides a chamber 34 communicating via a port 35 with the interior of the sleeve 15. The lower surface of the diaphragm 21 is subjected to well fluid by the aid of a port 36 located in a cover plate 37. Such equilibrium of pressure between the rotor space and the exterior well liquid is useful whether or not the rotor space has a filling different from well liquid.

The cover plate 37, body 32 and cover 31 are appropriately attached to the cover 26.

A light compression spring 38 urges the diaphragm 21 upwardly. This spring ensures, during installation of the motor, that the fluid pressure within the sleeve 15 at least slightly exceeds the external well pressure, thereby preventing material ingress of well liquid during this period.

The inventor claims:

1. In a submersible electric motor adapted to be immersed in well liquid: a casing forming an annular space for a stator structure; an annular stator structure in said space and having windings; an insulating liquid filling for the structure; a tubular member of plastic material attached to the inner periphery of the structure and sealing the said annular space of the structure; a movable and flexible wall defining respectively a chamber in communication with the space in which the rotor is located and a chamber in communication with well liquid; and a second movable wall defining respectively a chamber in communication with the interior of the stator structure, and a chamber in communication with well liquid; said two flexible walls being arranged adjacent the lower end of the motor and one above the other, whereby well liquid in the rotor space is prevented from intermingling with the insulating liquid via the plastic tubular member.

2. In a submersible electric motor: a casing forming an annular space for a stator structure, said casing being adapted to be immersed in well liquid: an annular stator structure in said space and having windings; an insulating liquid filling for the structure; a tubular member attached to the inner periphery of the stator structure and sealing the said annular space of the structure; the space within the tubular member being subjected to well liquid; a cover member for the lower end of the casing; said cover member having an opening communicating with the interior of the tubular member, a flexible wall covering the cover member and having a lower surface subjected to the well liquid, whereby the liquid pressure in the interior of the tubular member conforms to that of the well liquid pressure exterior of the casing; a hollow body member of inverted cup shape below the cover member; a second flexible wall defining a chamber with the hollow body; means providing communication between said chamber and the annular space, whereby one surface of said second flexible wall is subjected to the pressure of the insulating liquid filling; and means subjecting the other side of the second flexible wall to well liquid pressure exterior of the casing, whereby the pressure of the insulating liquid conforms to the pressure of the well liquid.

References Cited in the file of this patent

UNITED STATES PATENTS

| | | |
|---|---|---|
| 2,687,695 | Blom et al. | Aug. 31, 1954 |
| 2,739,252 | Patterson et al. | Mar. 20, 1956 |
| 2,752,597 | Penlington | Apr. 17, 1956 |